United States Patent [19]

Menninga

[11] 3,993,933

[45] Nov. 23, 1976

[54] ELECTRIC OVERVOLTAGE GAS ARRESTER WITH METALLIC SHORTING MECHANISM

[75] Inventor: Gysbert L. Menninga, Highland Park, Ill.

[73] Assignee: CEAC of Illinois, Inc., Rosemont, Ill.

[22] Filed: Feb. 20, 1975

[21] Appl. No.: 551,360

[52] U.S. Cl. .................................... 317/62; 337/32

[51] Int. Cl.$^2$ .......................................... H02H 9/06

[58] Field of Search ................ 317/61, 61.5, 62, 66; 337/31, 32, 33, 34, 28

[56] References Cited

UNITED STATES PATENTS

| | | | |
|---|---|---|---|
| 2,619,518 | 11/1952 | Kelsay | 337/32 X |
| 3,755,715 | 8/1973 | Klayum et al. | 317/62 |
| 3,886,411 | 5/1975 | Klayum | 317/62 |
| 3,898,533 | 8/1975 | Scudner, Jr. | 317/62 X |

*Primary Examiner*—Harry Moose

*Attorney, Agent, or Firm*—Russell H. Clark

[57] ABSTRACT

The overvoltage arrester disclosed in the drawings employs a surge voltage gas tube in combination with a fusible element and also unique and novel means for effecting a metallic connection between the transmission line and ground in the event the fusible element is caused to melt. One element of the unique and novel means for effecting the metallic connection includes a coil spring having encircling relation with part of the gas tube. As a result of the metallic connection which includes the coil spring, the gas tube is shorted and overheating of the said tube is effectively prevented.

5 Claims, 9 Drawing Figures

Fig. 1.
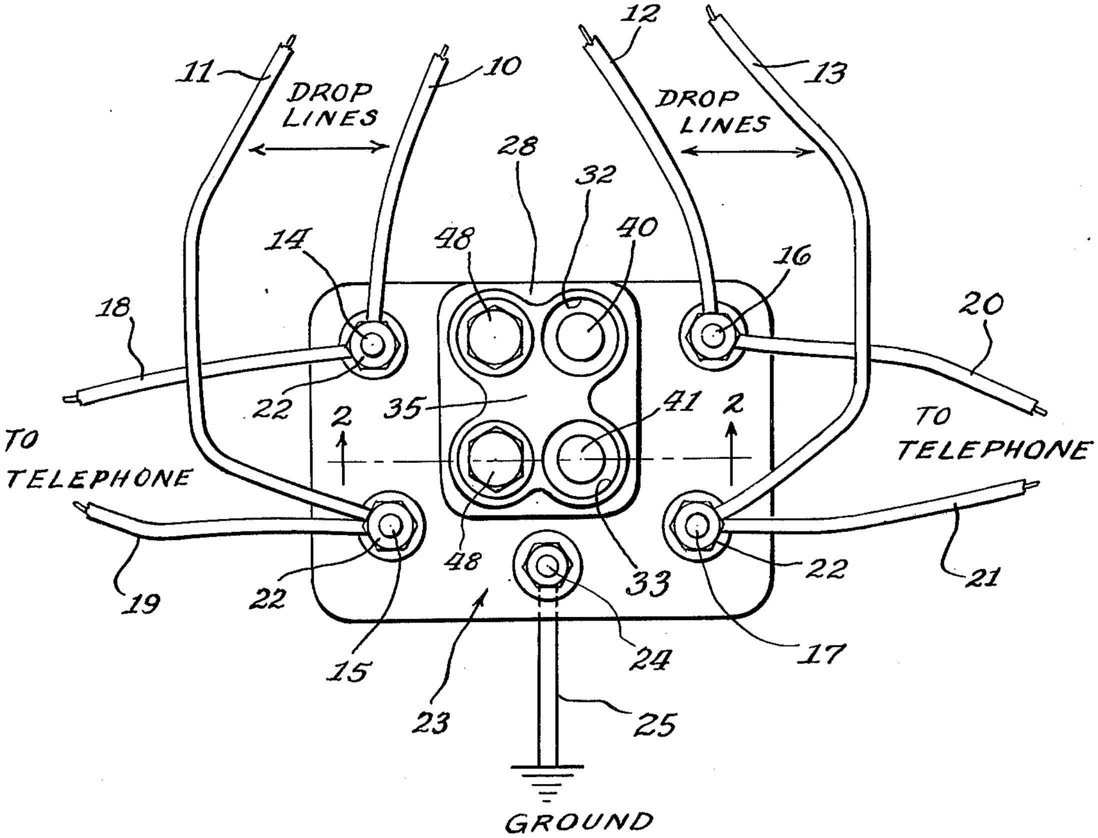
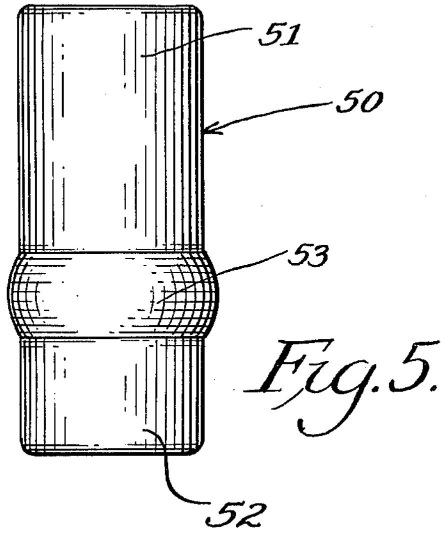
Fig. 5.
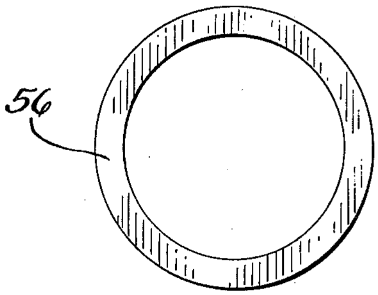
Fig. 6.

Fig. 8.
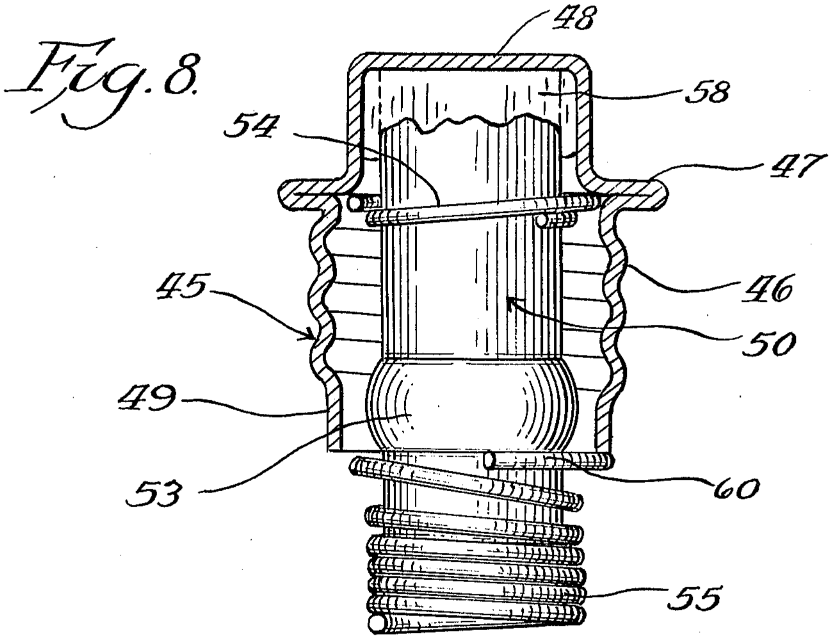
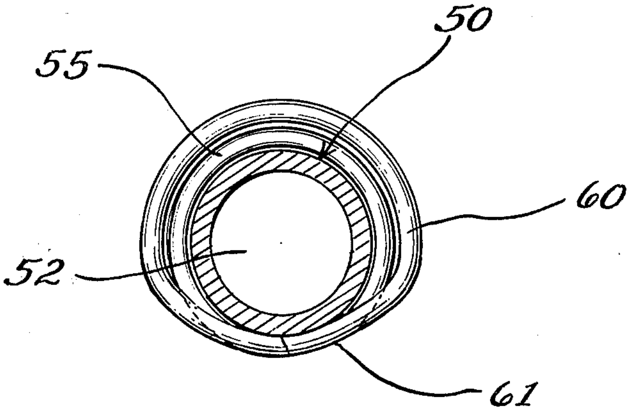
Fig. 9.

ELECTRIC OVERVOLTAGE GAS ARRESTER WITH METALLIC SHORTING MECHANISM

The invention relates generally to electric overload arresters and has reference more particularly to devices of an electric nature for protecting equipment connected to telephone and other transmission lines from the consequences of excessive line voltages and which are often referred to as surge voltage protectors or lightning arresters.

The invention relates specifically to that class of surge voltage protectors which employ gas tube arresters such as have a valve characteristic that permits them to function as non-conductors under normal conditions and as conductors under excessive voltage conditions. Thus, when a high voltage surge, such as lightning, is applied to a transmission line, the gas tube operates limiting the voltage on the line and shunting the current to ground. After the surge has passed the gas tube returns to a normal nonconducting state. Likewise with an extended period of excessive voltage, such as from a power fault, the gas tube will also become conductive limiting the voltage and shunting the current to ground. However while the gas tube is conducting it generates considerable heat and this constitutes its major undersirable characteristic.

Gas tubes as used in electric overvoltage arresters essentially consist of electrodes separated by a ceramic insulator with a special gas between the electrodes in a sealed chamber. When the voltage between the electrodes becomes excessive, the voltage arcs and ionizes the special gas and thus provides a conductive plasma between the electrodes. The plasma has two distinct stages. On high currents it is in the "arc" stage limiting the voltage to typically not more than 50 volts. On low currents the plasma is in the "glow" stage limiting the voltage to typicallly not less than 100 volts. Accordingly when the gas tube is in the conducting condition for an extended period of time it generates considerable heat even with low currents.

Operation of overvoltage gas tubes on lightning surges presents no problem because the conduction time is of such short duration that excessive heat is not generated. However on power faults, conduction may last for several minutes and consequently the gas tube arrester will heat up to an extend where its temperature becomes excessive and dangerous. Because overvoltage arresters are usually installed on wood surfaces and frequently have flammable materials near them or even touching them, they sometimes start fires when overheated. Telephone companies have recently expressed concern about this condition. Underwriters Laboratories now require as a condition for approval that the arrester will not overheat under any of the conditions as above explained.

It is an object of the present invention to provide an electric overvoltage arrester of the surge voltage gas tube type wherein the arrester will employ a fusible element in combination with novel means for effecting a metallic connection between the transmission line and ground in the event the fusible element is caused to melt. As a result of the metallic connection the gas tube is by-passed and overheating of the same is effectively prevented.

Another object of the invention is to provide an electric overvoltage arrester of the gas tube type wherein a fusible element, a gas tube and spring mechanism are combined in a novel and unique manner to protect electrical transmission lines from excessive voltages.

Another and more specific object resides in the provision of an electric overvoltage arrester consisting essentially of a metal housing, a surge voltage gas tube, a fusible element and spring mechanism in encircling relation with part of the gas tube, and wherein the spring mechanism is effective upon melting of the fusible element to connect the transmission line to ground, said connection taking place through the spring mechanism and the metal housing thereby completely bypassing the gas tube.

Another object is to provide an overvoltage arrester as described having a gas tube combined with a coil spring in such a manner that the coil spring has a dual function, namely, to resiliently bias the gas tube into contact with the fusible element and said element into contact with the cap of the metal housing and two, to provide a conducting path to the metal housing in the event the fusible element is caused to melt.

A further object of the invention is to provide an overvoltage arrester as described wherein the gas tube is frictionally retained co-axially within the metal housing by a spring clip whereby to permit the components of the arrester to be conveniently and quickly assembled and removed.

With these and other objects in view, the invention may consist of certain novel features of construction and operation as will be more fully described and pointed out in the specification and in the claims appended thereto.

In the drawings which illustrate an embodiment of the arrester device of the invention and wherein like reference characters are used to designate like parts;

FIG. 1 is a top plan view showing a typical telephone installation for two drop lines and wherein each line is protected by the overvoltage arrester device of the invention;

FIG. 5 is a front elevational view of a gas tube such as employed in the present arrester device; and FIG. 6 is a plan view of the metal ring which functions as a stop ring for the coil spring.

FIG. 8 is a vertical sectional view of the metal housing as shown in FIG. 7, the same illustrating the action of the coil spring in making metallic contact with the metal housing upon the melting of the fusible element; and FIG. 9 is a plan view of the coil spring taken along line 9—9 of FIG. 7.

Figure 2:
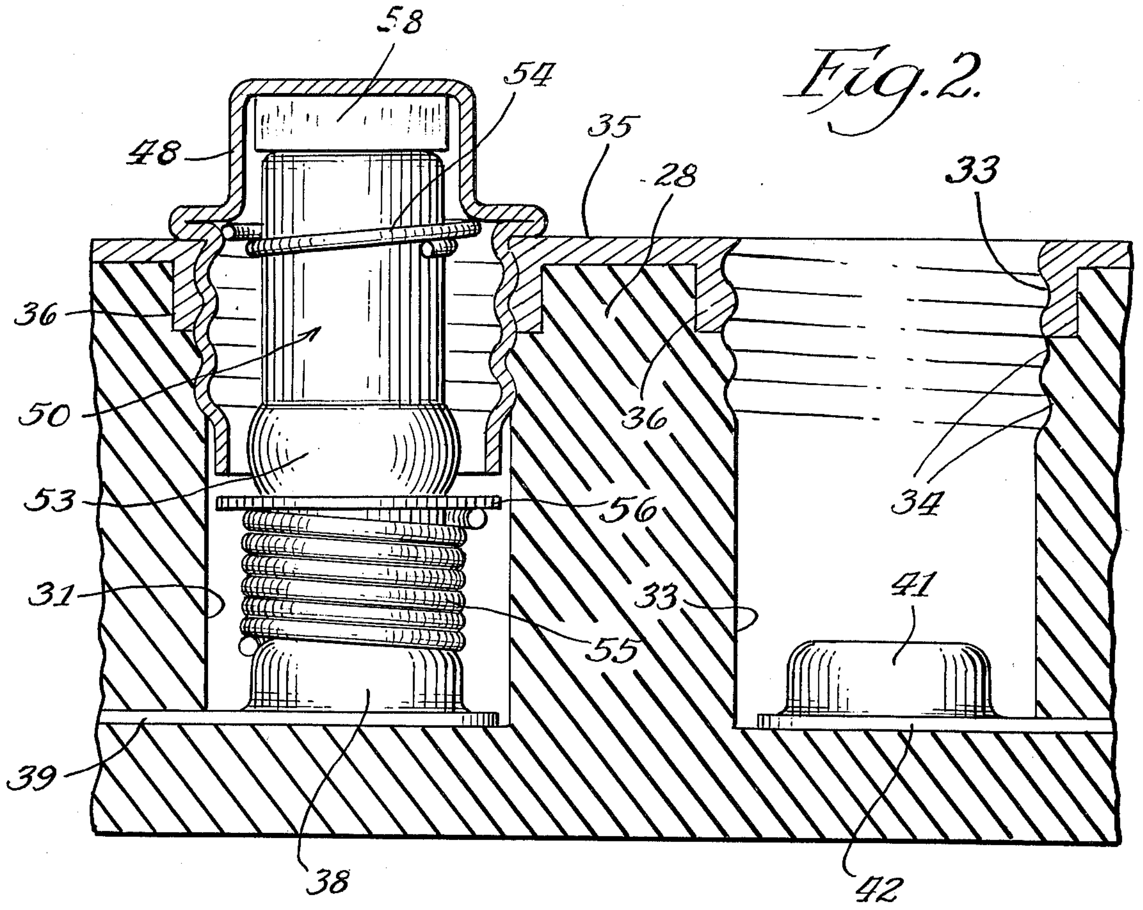
FIG. 2 is a fragmentary vertical section view taken substantially along line 2—2 of FIG. 1, the view showing the parts on an enlarged scale to bettter illustrate the improved features of the invention.

In the drawings, FIG. 1 shows in plan view a subscriber's telephone installation having a pair of drop lines comprising the conductors 10–11 and 12–13 which are respectively connected to the binding posts 14–15 and 16–17. The conductors 18–19 and 20–21 leading to the telephones are also connected to binding posts 14–15 and 16–17 respectively and the wires are held to each of the posts by the lock nuts 22. The binding posts are spaced as shown and the same are anchored in a base member 23 of any suitable material such as ceramic, hard rubber or a durable insulating plastic. The said base member includes an integral, substantially square, upright support portion 28 which is recessed at four locations to provide openings for receiving the arrester device of the invention. The openings are indicated by the numerals 30, 31, on the left side of the support portion and by 32, 33 on the right side. Each of the recesses are provided with grooves in their cylindrical wall to form the screw threads 34 and also it will be observed that the screw threads are continued into the metal plate 35, FIGS. 1 and 2, the same being embedded in the portion 28 substantially flush with the top surface thereof. The plate 35 has four depending cylindrical portions 36, each being aligned with one of the openings and having grooves on their interior surface to continue the grooves 34 so that the screw threads are continuous in each opening from the top surface of the metal plate 35 to approximately half the depth of the opening.

The metal plate 35 is a grounding plate since it is connected by an embedded conductor to binding post 24 which in turn is electrically connected by conductor 25 to ground. Additional conductors are embedded in the base member 23, one for each of the binding posts, FIG. 2 shows the embedded conductor 39 which is electrically connected to binding post 15, the said conductor having the terminal button 38 integral therewith and which is centrally positioned at the bottom of the opening 31. A similar embedded conductor is provided for binding post 14 and associated opening 30, not shown. Also for the binding post 16 the embedded conductor has the terminal button 40, FIG. 1, in the bottom of opening 32 and the terminal button 41 in the bottom of opening 33 is integral with embedded conductor 42 having electrical connection with the binding post 17, FIG. 2.

Figure 3:
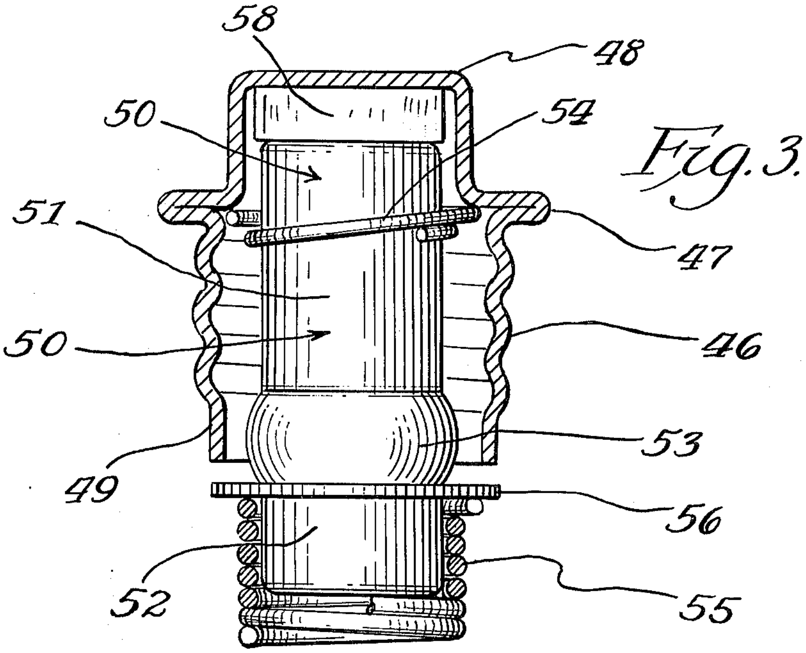
FIG. 3 is a vertical sectional view of the metal housing with the gas tube, fusible element and spring mechanism in associated relation therewith as normally installed.
Figure 4:
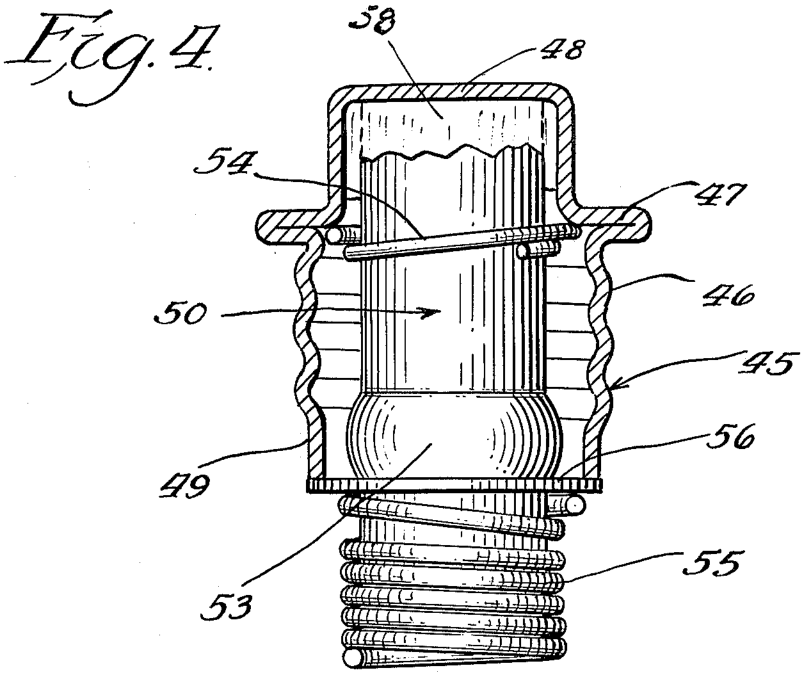
FIG. 4 is a vertical sectional view similar to FIG. 3, but illustrating the action of the spring mechanism in making a ground connection with the metal housing upon the melting of the fusible element.

The overvoltage arrester device of the invention is best shown in FIGS. 3 and 4, wherein the numeral 45 indicates a metal housing of substantially cylindrical shape having grooves formed in its cylindrial wall to provide screw threads 46 for threaded coaction with the screw threads 34 when the housing is threaded in its particular opening. The stop flange 47 may be formed integral with the metal housing and likewise the metal cap 48, although both may be formed separately and welded in place. Below the screw threads 46 the housing terminates in a cylindrical skirt portion 49. Thus it will be understood that the cylindrical housing or retainer, formed of any suitable conductive metal, has a closed top end and an open bottom end. The said housing frictionally retains the elements of the arrester and these will now be described in detail.

The surge voltage gas tube is indicated by numeral 50, FIG. 5, and the same consists of a cylindrical top and bottom part 51 and 52 which are joined by the bulbous ceramic portion 53. A special gas is sealed in a chamber within the tube as previously stated, and the tube is conductive from part 51 to part 52 when the gas becomes ionized. The spring clip 54 frictionally retains the gas tube within the housing 45 and it will be seen that the tube is suspended substantially co-axially within the housing with the bottom part 52 of the tube depending below the skirt portion. By reason of the rather simple spring clip, the elements of the arrester can be quickly assembled and removed.

The spring mechanism of the arrester device is in electrical contact with the bottom part 52 and said mechanism includes the coil spring 55 and the metal stop ring 56, FIG. 6. The ring is resiliently maintained up against the bulbous portion 53 by the coil spring 55 which is frictionally associated with the bottom part 52 of the gas tube. In fact the coil spring and also the metal ring have encircling relation with said part. It may also be noted that the coil spring has its convolutions in electrical contact with one another and the convolutions are also in electrical contact with metal part 52 of the tube.

Probably the most important element of the arrester is the fusible element 58 which is located between the metal cap 48 and the top of part 51 of the gas tube 50. The said fusible element may consist of an alloy preferably an eutectic alloy and which may contain the metals bismuth, tin and lead and have a melting point below 365 degrees Fahr. More particularly the melting point of the fusible element may range from 180 to 210 degrees Fahr. with a desirable melting point around 200 degrees Fahr.

FIGS. 2 and 3 show the components of the arrester in the position they assume following installation. In FIG. 1, an arrester device has been threaded into each opening 30 and 31 and the cap is hexagonal to assist in the threading operation. The threads 46 on the housing are received by the threads 34 and the threading action continues until the stop flange 47 contacts the metal grounding plate 35. As installed, the coil spring 55 rests on a terminal button such as 38, FIG. 2, and the spring is in electrical connecion with conductor 39 and thus with the binding post 15. The coil spring is also the energizing force which maintains the metal ring 56 up against the bulbous portion 53 and thus the coil spring maintains the gas tube in contact with the fusible element and the element in contact with the cap of the housing. It is of course necessary that the flexible element 58 have a thicknes such as will space the ring 56 the desired distance below the skirt 49 and out of contact with the metal housing 45. Also in determining the thickness of the fusible element the melting point of the element and the heat produced by the tube over a selected time period of conduction must be considered.

With the parts of the arrester device positioned as shown in FIGS. 2 and 3, and assuming an excessive voltage is placed on the incoming drop lines as by a lightning stroke, then the lines will be conveniently grounded since the gas tube becomes conductive and the circuit is completed from button 38, FIG. 2 for example, through the coil spring 55, the said gas tube, fusible element, the housing 45 and then to the grounding plate 35. No problem as regards excessive heating of the gas tube is presented here since the conducting time is short.

However, in the event of an excessive voltage appearing on the drop lines as from a power fault or a power line contact with the telephone transmission line, then the conduction of the gas tube may last for several minutes and the tube will heat up to such an extent as will melt the fusible element. Upon melting of the fusible element the parts of the arrester assume the position shown in FIG. 4. The clip 54 only frictionally holds the gas tube so that with the melting of the element the coil spring is effective to force the gas tube in an upward direction to cause the metal ring 56 to contact the metal housing 45. When such contact takes place the drop line is immediately grounded, the circuit from the button 38 including the coil spring 55, the ring 56, the housing 45 and then to the grounding plate 35. The metallic grounding connection of the ring with the housing has the effect of shorting the gas tube and excessive heating of the tube does not take place. The metallic grounding connection is unique since it is initiated by the coil spring 55 and also the coil spring functions as part of the conductive path to the grounding plate. Of course, in order to effect the metallic grounding connection to short out the gas tube, it is necessary that the metal ring have a diameter about equal to or somewhat larger than the diameter of the skirt portion 49 of the metal housing 45.

Figure 7:
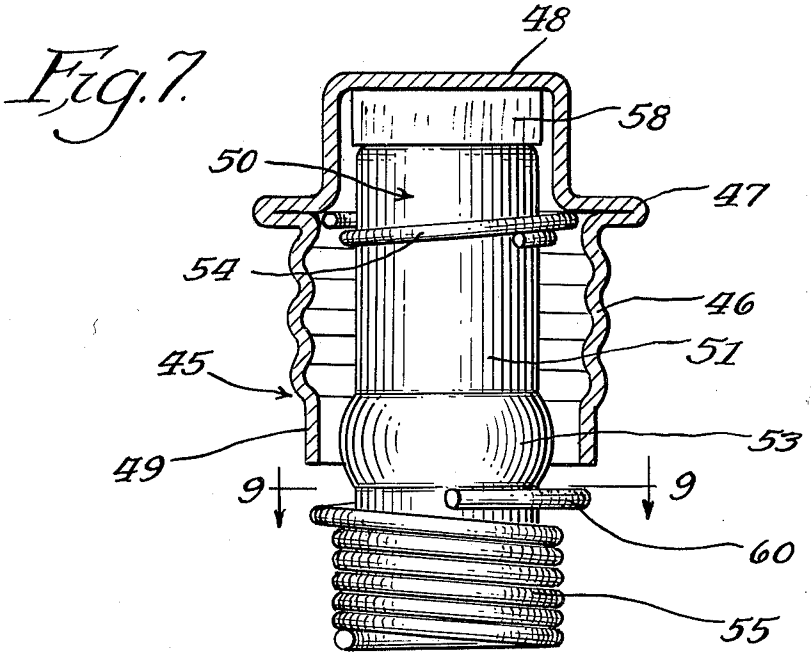
FIG. 7 is a vertial sectional view of the metal housing similar to FIG. 3, but showing a modified form of the invention wherein the metal stop ring is eliminated.

A modification of the invention is shown in FIGS. 7 and 8, wherein the metal ring is eliminated and its function is taken over by the coil spring. The metal housing as shown in said Figures is similar in all respects to that as shown in FIGS. 2, 3 and 4, with the gas tube 50 being frictionally suspended co-axially within the cylindrical housing 45 by the spring clip 54. Here also the gas tube includes the parts 51 and 52 with the same being separated and sealed by the ceramic portion 53 to seal the interior chamber containing the special gas. Likewise the fusible element 58 is located between and in electrical contact with the gas tube and the top cap of the housing all as previously described.

In said FIGS. 7 and 8, the function of the metal ring is taken over by the coil spring 55 and this requires that the top convolution 60 of the coil spring have an enlarged diameter somewhat greater than the diameter of the convolutions below the same and which are in frictional contact with part 52 of the gas tube. The enlarged diameter of the top convolution is at least equal to or slightly greater than the diameter of the skirt 49. In fact the top convolution is not only enlarged in diameter but also deformed or bent to provide the bent end 61 which is bent inwardly to engage the bulbous portion 53 directly below the same and where it joins with part 52. See FIGS. 7 and 9.

With the melting of the fusible element 58, the operation of the parts as shown in FIGS. 7 and 8 is substantially the same as described for FIGS. 2, 3 and 4. When the element 58 melts the coil spring 55 urges the gas tube upwardly by reason of the contact which the top convolution has with the bulbous portion 53. This upward movement of the tube causes the enlarged top convolution 60 to engage the skirt portion 49 as shown in FIG. 8. The metallic connection which thus results passes the current from the coil spring to the metal housing and then to ground thus by-passing the gas tube.

What is claimed is:

1. In an electric overvoltage arrester of the character described, the combination with a metal housing member substantially cylindrical in shape and having a closed top end and an open bottom skirt portion, of a surge voltage gas tube having cylindrical ends of metal separated by a sealed ceramic bulbous part, said gas tube being carried by the housing in a manner whereby one metal end of the gas tube depends below the open skirt portion of the same, a coil spring located on said depending end of the gas tube, a fusible element interposed between the other end of the gas tube and the closed top of the housing member, the coil spring being effective before expansion to yieldingly maintain the other end of the gas tube in contact with the fusible element and to maintain the fusible element in contact with the closed top of the housing member, a metal ring also located on said depending end of the gas tube and being positioned between the bulbous portion and the top convolution of the coil spring, said ring being normally spaced below the skirt portion due to the thickness of the fusible element and having a diameter at least equal to the skirt portion, whereby upon melting of the fusible element by an overvoltage current the coil spring upon expansion can be effective to cause the ring to move up into contact with the skirt portion of the metal housing thereby shorting the gas tube, and whereby the coil spring will thus function as a conductive path for conducting said overvoltage current to the metal housing.

2. An electric overvoltage arrester of the character as defined by claim 1, additionally including an insulating support having an opening in its top surface adapted to threadedly receive the metal housing member, said opening having a terminal button on its botton wall, and wherein said housing member when threadedly in place in the insulating support is effective to cause the coil spring to contact the terminal button.

3. In an electric overvoltage arrester of the character described, the combination with a metal housing member substantially cylindrical in shape and having a closed top end and an open bottom skirt portion, of a surge voltage gas tube having cylindrical ends of metal separated by a sealed ceramic bulbous part, said gas tube being being carried by the housing in a manner whereby one metal end of the gas tube depends below the open skirt portion of the same, a fusible element interposed between the other end of the gas tube and the closed top of the housing member, a coil spring in encircling relation and in frictional contact with the depending end of the gas tube, said coil spring being effective before expansion to yieldingly maintain the other end of the gas tube in contact with the fusible element and to also maintain the fusible element in contact with the closed top of the housing member, and said coil spring having a position on the depending end of the gas tube so that the top convolution of the coil spring is normally spaced below the skirt portion due to the thickness of the fusible element, whereby upon melting of the fusible element by an overvoltage current the coil spring upon expansion can be effecitve to move the gas tube towards the closed top end to thus cause the coil spring to have electrical conductive relation with the skirt portion of the housing thereby shorting the gas tube, and whereby the coil spring will thus function as a conductive path for conducting said overvoltage current to the metal housing.

4. An arrester of the character as defined by claim 3, additionally including an insulating support having an opening in its top surface adapted to threadedly receive the metal housing member, said opening having a terminal button on its bottom wall, and wherein said housing member when threadedly in place in the insulating support is effective to cause the coil spring to contact the terminal button.

5. An overvoltage arrester as defined by claim 3, wherein the metal housing is adapted to be threaded in an opening, and wherein the coil spring has an enlarged top convolution of a diameter at least as large as the diameter of the skirt portion, said top convolution also having an inwardly bent end so as to resilently engage and have contact with the depending end of the gas tube immediately below the bulbous portion.

* * * * *